United States Patent [19]

Hausman et al.

[11] Patent Number: 5,473,607
[45] Date of Patent: Dec. 5, 1995

[54] PACKET FILTERING FOR DATA NETWORKS

[75] Inventors: Richard J. Hausman, Soquel; Lazar Birenbaum, Saratoga, both of Calif.

[73] Assignee: Grand Junction Networks, Inc., Union City, Calif.

[21] Appl. No.: 103,659

[22] Filed: Aug. 9, 1993

[51] Int. Cl.$^6$ .................................................. H04L 12/28
[52] U.S. Cl. ...................... 370/85.13; 370/94.1; 370/92
[58] Field of Search .................... 370/60, 60.1, 85.13, 370/85.14, 94.1, 94.2, 94.3, 92, 85.3; 395/159, 118, 400

[56] References Cited

U.S. PATENT DOCUMENTS

| | | | |
|---|---|---|---|
| 4,399,531 | 8/1983 | Grande et al. | 370/60 |
| 4,627,052 | 12/1986 | Homre et al. | 370/85.13 |
| 4,679,193 | 7/1987 | Jensen et al. | 370/94.1 |
| 4,891,803 | 1/1990 | Juang et al. | 370/60 |
| 4,933,937 | 6/1990 | Konishi | 370/85.13 |
| 5,032,987 | 7/1991 | Broder et al. | 364/200 |
| 5,210,748 | 5/1993 | Onishi et al. | 370/60 |
| 5,218,638 | 6/1993 | Matsumoto et al. | 380/23 |
| 5,247,620 | 9/1993 | Fukuzawa et al. | 370/85.13 |
| 5,274,631 | 12/1993 | Bhardwaj | 370/60 |

OTHER PUBLICATIONS

Kalpana, Etnerswithc Product Overview, Mar. 1990, pp. 1–20.
Artel, Galactica Stenbridg C/802.3 Application Note, Nov. 1991, pp. 1–26.
Synernetics, Lanplex 5000: Intra–Network Banowidth, 1992, pp. 1–12.
Synernetics, Lanplex 5000 Intelligent Switching Hubs, 1993, pp. 1–9.
Synernetics, Lanplex 5000 Family, 1992. pp. 1–6.
Synernetics, Etheract Express Module, 1991, pp. 1–4.
Alantec, Powerhub Arthitectures, Dec. 1992, pp. 1–6.
Bradner, Scott O., "Ethernet Bridges and Routes", Feb. 1992, pp. 1–10, Data Communications.
Kwok, Conrad K. and Biswanath Mjkherjec, "Cut–Through Bridging for CSMA/CE Local Area Network", Jul. 1990, pp. 938–942, I EEE Transactions on Communications, vol. 38, No. 7.

Primary Examiner—Douglas W. Olms
Assistant Examiner—Chau T. Nguyen
Attorney, Agent, or Firm—Michael J. Hughes

[57] ABSTRACT

An improved partial packet filter (10) for filtering data packets (210) in a computer network (12) wherein a candidate field (413) of the data packet (210) is hashed to a plurality of bit-wise subsets (636) each being an independent representation of the candidate field (413). Each of the bit-wise subsets (636) is compared to a reference hash table (644) which has been prepared in a preliminary operation series (514). The preliminary operation series (512) configures a plurality of target fields (714) to set selected memory locations (312) in the reference hash table (644).

17 Claims, 4 Drawing Sheets

PACKET FILTERING FOR DATA NETWORKS

TECHNICAL FIELD

The present invention relates generally to the field of computer science and more particularly to data networking and component devices attached to data networks.

BACKGROUND ART

Computer networks are becoming increasingly common in industry, education and the public sector. The media over which data are carried generally carry data in units referred to as "packets" which are destined for many different sources. Addressing and packet typing are included in most standardized and proprietary packet based networking protocols which make use of destination address fields at the beginning of and/or within each data packet for the purpose of distinguishing proper recipient(s) of the data of the packets. As a packet is received at intermediate and end components in a system, rapid determination of the proper recipient (s) for the data must be made in order to efficiently accept, forward, or discard the data packet. Such determinations are made based upon the above discussed address, packet type and/or other fields within the relevant packets. These determinations can be made by network controller hardware alone, by a combination of hardware and software, or by software alone. In broadcast type networks, every node is responsible for examining every packet and accepting those "of interest", while rejecting all others. This is called "packet filtering". Accuracy, speed and economy of the filtering mechanism are all of importance.

When the above discussed determinations are made through a combination of hardware and software, the hardware is said to have accomplished a "partial filtering" of the incoming packet stream. It should be noted that one type of packet filtering is accomplished on the basis of packet error characteristics such as collision fragments known as "runts", frame check sequence errors, and the like. The type of filtering relevant to the present discussion is based upon packet filtering in which filtering criteria can be expressed as simple Boolean functions of data fields within the packet as opposed to filtering based upon detection of errors or improperly formed packets.

In the simplest case, each node of a computer network must capture those packets whose destination address field matches the node's unique address. However there frequently occur situations in which additional packets are also of interest. One example occurs when the node belongs to a predefined set of nodes all of which simultaneously receive certain specific "groupcast" packets which are addressed to that group. Groupcast packets are usually identified by some variation of the address field of the packet. Groupcast address types generally fall into one of two forms. "Broadcast" addresses are intended for all nodes and "multicast" addresses are targeted for specific applications to which subsets of nodes are registered. Another case of such field-based packet filtering occurs when certain network management nodes are adapted to focus on specific protocols, inter-node transactions, or the like, to the exclusion of all other traffic.

Attachment of a networked device to the network is realized through a "controller" which operates independently of the host processor. Packet filtering then occurs in two successive stages beginning at the controller, which examines packets in real-time. To accomplish this, the controller is "conditioned" with an appropriate subset of the specified filtering criteria, according to the filtering capabilities of that controller. The controller classifies packets into three categories: Those not satisfying the filter criteria ("rejects"); those satisfying the criteria ("exact matches"); and those possibly satisfying the criteria ("partial matches"). Rejects are not delivered to the processor. Those packets which are classified as exact or as possible matches are delivered, with appropriate indications of their classification, to the device processor. The controller, ideally, excludes as many unwanted packets as its capabilities will allow, and the host processor (with the appropriate software operating therein) completes the overall filtering operation, as required. The value of filtering packets at the controller level (the partial filtering) is that it reduces the burden on the host processor.

Controller filtering implementations are constrained by the fact that they must process packets in real-time with packet reception. This places a high value on filtering mechanisms that can be implemented with a minimum amount of logic and memory. Controller based filtering criteria are contained in a target memory. In the case of exact matching, a literal list of desired targets is stored in the target memory. While exact matching provides essentially perfect filtering, it can be used in applications wherein there are only a very small number of targets.

Partial filtering is employed when the potential number of targets is relatively large, such as is often the case in multicast applications. A primary consideration is the "efficiency" of the partial filter. Efficiency (E), in this context, may be expressed as:

$$E = Tn/Pn$$

where:

Tn=the number of target packets of interest; and

Pn=the number of potential candidates delivered to the processor.

An efficiency of E=1.0 represents an exact filtering efficiency wherein every candidate is a desired target. This is the efficiency of the filtering which occurs in the "exact matching" previously discussed herein. While exact filtering efficiency is an objective, the previously mentioned constraints, including that the controller must do its filtering in essentially real-time, will generally not allow for such efficiency.

The predominant method used in the prior art for partial packet filtering is "hashing". The process conventionally begins with the extraction from each received packet of all fields involved in the specified filtering criteria. The composite of such relevant fields is called the "candidate field". Assuming an even distribution of candidate fields (a situation that is not always literally accurate, but the assumption of which is useful for purposes of analysis), there will be a potential number of packet candidates of $2^{Cb}$ where Cb is the number of bits in the candidate field. The hashing function produces a reduction in the bit size of the candidate field according to a "hashing function". As a part of the initiation of the controller, the hashing function is applied to each field of the target memory to assign a "target hash value" to each such field. The controller memory is initialized as a bit mask representing the set of target hash values. Then, during operation, a "candidate hash value" is created by applying the hashing function to each candidate field. The candidate hash value is used as a bit index into the controller memory, with a match indicating a possible candidate.

As can be appreciated in light of the above discussion and from a general understanding of simple hashing operations, the hashing function has the effect of partitioning the $2^{Cb}$ candidate possibilities into Mb groups (called "buckets"), where Mb is the number of bits in the controller's target memory. Because candidate packets that fall into the same bucket are not distinguished, a "hit" represents any of $2^{Cb}$/Mb candidates. Useful hashing functions will partition the candidate possibilities in a roughly uniform distribution across the set of Mb buckets. For a single target, the efficiency of such a hashing method is Mb/$2^{Cb}$ If Tn desired targets are represented by Bn buckets (where Bn<=Tn and Bn<=Mb, the efficiency of such a hashing method is:

$$E=Tn/(Bn2^{Cb}/Mb)=TnMb/Bn2^{Cb}$$

In exact matching, target memory could hold Mb/Cb targets. Hashing is appropriate when the number of buckets (Bn) is larger than this figure. However, effective hashing also requires that the number of buckets be less than Mb, because as target memory density increases there is less differentiation among candidate fields. With the target memory full of hash targets, Bn=Mb and the efficiency is Tn/$2^{Cb}$.

As can be appreciated, the described prior art hashing method used for partial packet filtering implies a loss of information in that a single hash value potentially represents a large set of candidates. Clearly, it would be desirable to reduce such loss of data. Correspondingly, it would desirable to maximize the filtering efficiency for a given Mb or (or to minimize the Mb for a given filter efficiency).

To the inventor's knowledge, no prior art method for partial packet filtering has improved efficiency or reduced data loss as compared to the conventional hashing method described above.

DISCLOSURE OF INVENTION

Accordingly, it is an object of the present invention to provide a method and means for efficiently performing a partial filtering operation on data packets in a computer network.

It is another object of the present invention to provide a method and means for partial packet filtering which rejects a maximum number of incoming packets which are not at interest without requiring a large target memory and without unduly slowing down the processing of incoming packets.

It is still another object of the present invention to provide a partial packet filtering method and means which is inexpensive to implement.

It is yet another object of the present invention to provide a partial packet filtering method and means which will operate in real-time or near real-time.

It is still another object of the present invention to provide a partial packet filtering method and means which is adaptable to a variety of network system requirements.

Briefly, the preferred embodiment of the present invention implements multiple independent hashing functions applied in parallel to the candidate field of each packet. The combined application of multiple independent hashing functions results in specification of a hash matrix, with each coordinate of the hash matrix being the result of one of the hashing functions. The hash matrix includes the results of different hashing algorithms applied to a single candidate field, or the same hashing function applied to different subsets of the candidate field, or a combination thereof. The filter parameters consist of the set of acceptable result values for each hashing operation.

An advantage of the present invention is that partial packet filtering efficiency is improved, thereby freeing the host processor from a substantial portion of the packet filtering operation.

Yet another advantage of the present invention is that filtering efficiency is increased geometrically with an increase in target memory.

Still another advantage of the present invention is that a minimum amount of target memory is required for a specific target efficiency.

Yet another advantage of the present invention is that the partial packet filtering can be performed in a minimum amount of time for a given target efficiency.

These and other objects and advantages of the present invention will become clear to those skilled in the art in view of the description of the best presently known modes of carrying out the invention and the industrial applicability of the preferred embodiments as described herein and as illustrated in the several figures of the drawing.

BEST MODE FOR CARRYING OUT INVENTION

The best presently known mode for carrying out the invention is a partial packet filter for implementation in a personal computer resident Ethernet controller. The predominant expected usage of the inventive improved packet filter is in the interconnection of computer devices, particularly in network environments where there are relatively few targets.

Figure 1:
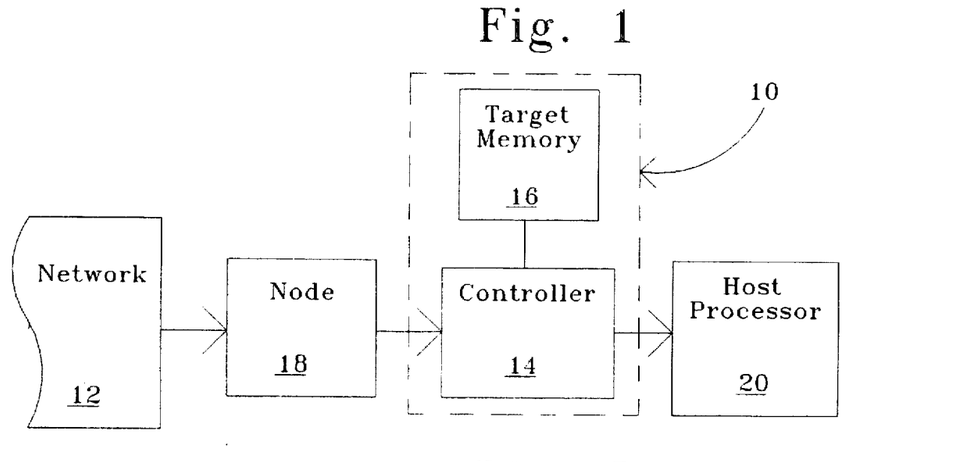
FIG. 1 is a block diagram depicting a portion of a computer network with an improved partial packet filter according to the present invention in place therein.

The improved partial packet filter of the presently preferred embodiment of the present invention is illustrated in a block diagram in FIG. 1 and is designated therein by the reference character 10. In the diagram of FIG. 1, the improved partial packet filter 10 is shown configured as part of a network system 12 (only a portion of which is shown in the view of FIG. 1). In many respects, the best presently known embodiment 10 of the present invention is structurally not unlike conventional partial packet filter mechanisms. Like prior art conventional partial packet filters, the best presently known embodiment 10 of the present invention has a controller 14 with an associated target memory 16. In the example of FIG. 1, the improved partial packet filter 10 receives data from a network node 18 and performs the inventive improved packet filtering process on such data before passing selected portions of the data on to a host processor 18 to which the improved partial packet filter 10 is dedicated.

Figure 2:
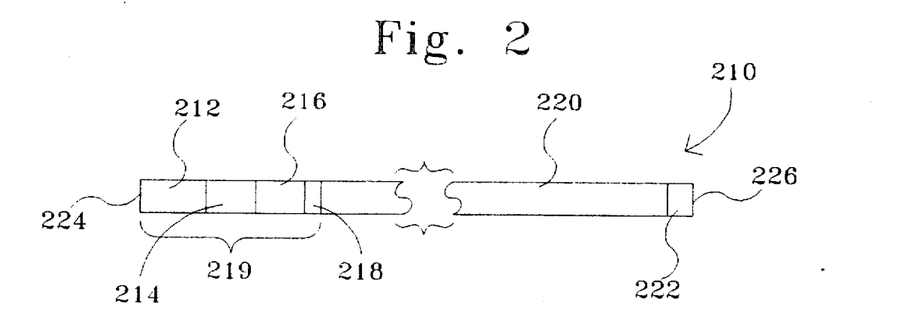
FIG. 2 is a diagrammatic representation of a conventional prior art Ethernet data packet.

FIG. 2 is a diagrammatic representation of a conventional Ethernet data packet 210. The standardized Ethernet packet 210 has a preamble 212 which is 64 bits in length, a destination address 214 which is 48 bits in length, a source address 216 which is 48 bits in length, a length/type field 218 which is 16 bits in length and a data field 220 which is variable in length from a minimum of 46 eight bit bytes to a maximum of 1500 bytes. Following the data field 220 in the packet 210 is a 4 byte (32 bit) frame sequence check ("FCS") 222. The packet 210 is transmitted serially beginning at a "head" 224 and ending at a "tail" 226 thereof. The preamble 212, destination address 214, source address 216 and length/type field 218 are collectively referred to as the header 219.

Figures 3, 4:
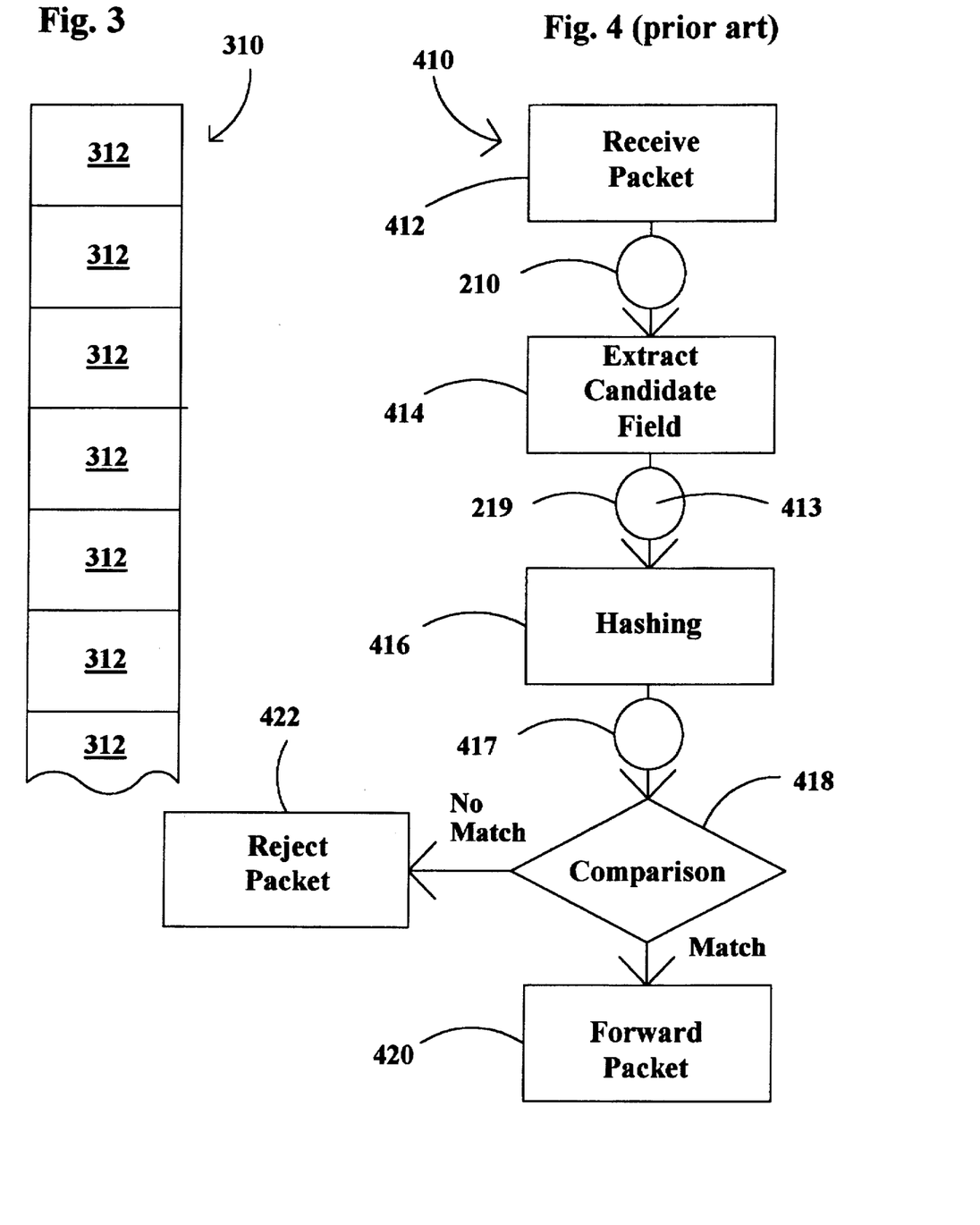
FIG. 3 is diagrammatic representation of a hash table.
FIG. 4 is a flow chart showing a conventional prior art partial packet filtering operation.

FIG. 3 is a diagrammatic representation of a conventional single dimensional hash table 310 with which one skilled in the art will be familiar. The hash table 310 has a plurality of address locations 312 each of which can be "set" (set to 1) or left unset (set to zero).

FIG. 4 is a flow diagram depicting the operation of a conventional prior art partial packet filtering operation 410. As previously discussed briefly, a packet 210 (FIG. 2) is received (receive packet operation 412) from the network 18 (FIG. 1) and a candidate field 413 (such as the header 219 of the packet 210) is extracted (extract candidate field operation 414). A hashing operation 416 is performed on the extracted candidate field 413 to produce a hash value 417 and the hash value 417 is compared to the hash table 310 (FIG. 3) stored in the target memory 16 (FIG. 1) in a comparison operation 418. If the result of the comparison operation 418 is a match, the packet 210 is forwarded in a forward packet operation 420. If the result of the comparison operation 418 is not a match, the packet 210 is rejected 422 in a reject packet operation. It should be remembered that the use of the header 219 here is an example only, and any portion or combined portions of the packet 210 might constitute the candidate field 413 in a given application.

Figure 5:
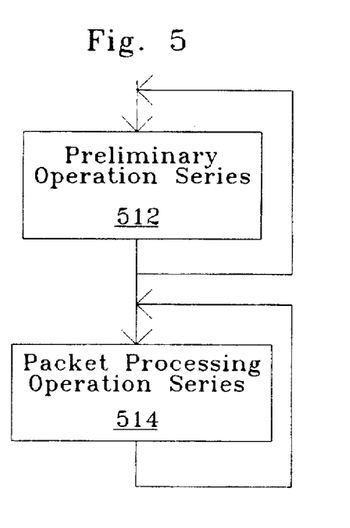
FIG. 5 is a block depiction of a partial packet filtering method according to the present invention.

FIG. 5 is a flow diagram depicting the inventive improved packet filtering process 510. The improved packet filtering process 510 is accomplished in a preliminary operation series 512 and a packet processing operation 514, each of which is repeated as required, as will be discussed hereinafter. The preliminary operation series 512 is accomplished according to software residing in the host processor 20 (FIG. 1) to configure the target memory 16 (FIG. 1) as will be discussed hereinafter. It should be noted that the fact that the improved packet filtering process 510 is divided into the two main operation categories (the preliminary operation series 512 and the packet processing operation 514) does not distinguish this invention over the prior art. Rather, the processes within the preliminary operation series 512 and the packet processing operation 514 describe the essence of the inventive process.

Figure 6:
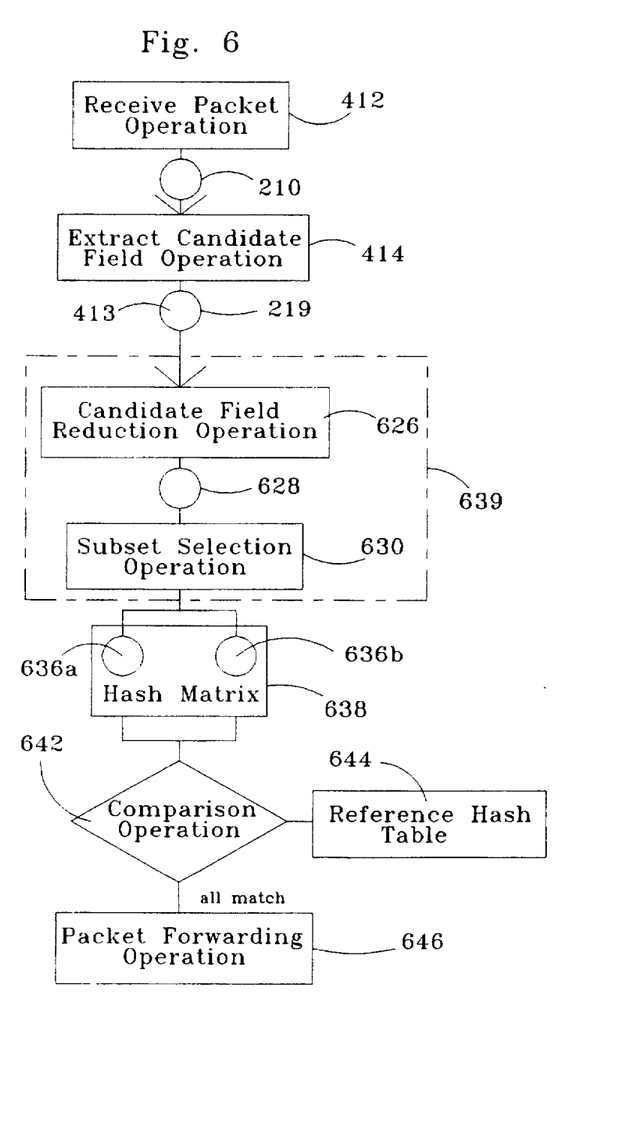
FIG. 6 is a flow chart, similar to the chart of FIG. 4, depicting the packet processing operation series of FIG. 5.

FIG. 6 is a flow chart showing the inventive packet processing operation 514 in a manner analogous to the presentation of the prior art partial packet filtering operation 410 depicted in FIG. 4. As can be seen in the view of FIG. 6, the packet processing operation series 514 is similar in many respects to the prior art partial packet filtering process 410 (FIG. 4). In the packet processing operation series 514, a packet 210 (FIG. 2) is received (receive packet operation 412) and a candidate field 413 is extracted in an extract candidate field operation 414. In the best presently known embodiment 10 of the present invention, the inventive packet processing operation series 514 next performs a candidate field reduction operation 626. In the best presently known embodiment 10 of the present invention, the candidate field reduction operation 626 is merely the application of the conventional CRC polynomial algorithm to the candidate field 413 to yield a 32 bit CRC output value 628 (although any of a number of similar algorithms might be applied for this purpose). Next, a subset selection operation 630 selects a predetermined number (two in the example of FIG. 6) of bit-wise subsets 636 from the CRC output value 628. The method for determining the quantity of bit-wise subsets 636 to be selected in the subset selection operation 630, and the size of each, will be discussed hereinafter. In the best presently known embodiment 10 of the present invention, the bit-wise subsets 636 are each 6 bits in length. It should be noted that, in the best presently known embodiment 10 of the present invention, the bit-wise subsets 636 are selected from the CRC output value 628 simply by taking the first 6 bits of the CRC output value 628, the second six bits, and so on until as many bit-wise subsets as are needed are obtained and so, in the best presently known embodiment 10 of the present invention, the bit wise subset 636 are "consecutive bit section " of the fixed size field (the CRC output value 628 in the best presently known embodiment 10 of the present invention. The inventors have determined that the bits of the CRC output value 628 (resulting from the CRC polynomial function) are independent of each other, and so any 6 bit portion of the CRC output value 628 is as representative of the CRC output value 628 as is any other 6 bit portion.

The bit-wise subsets 636 are then compared to the hash table 310 (FIG. 3) stored in the target memory 16 (FIG. 1) in a comparison operation 642. The combined multiple hash values 636 may be considered to be a hash matrix 638 (in the example of FIG. 6, a two dimensional hash matrix 638).

It is important to note that the essence of the present inventive method lies in the extraction of the plurality of independent or relatively independent representative indices of the candidate field 413 ("candidate filled indices") which, in the example of the best presently known embodiment 10 of the present invention are the bit-wise subsets 636 which make up the hash matrix 638. That is, the bit-wise subsets 636 are representative fields in that the bit-wise subsets 636 are representative of the candidate field 413, as discussed above. The generally simultaneous (parallel) processing of these is the source of the advantages of the present inventive method and means. The exact method described herein in relation to the best presently known embodiment 10 of the present invention, that of first reducing the candidate field 413 in the candidate field reduction operation 626 and then extracting the bit-wise subsets 636 is but one of many potential methods for accomplishing such a parallel hashing operation 639, and the present invention is not intended to be limited by this aspect of the best presently known embodiment 10.

In the best presently known embodiment 10 of the present invention, in a comparison operation 642, each of the bit-wise subsets 636 is compared to a reference hash table 644 (a "target hash array") stored in the target memory 16 (FIG. 1) and only if all match is the packet 210 forwarded in a packet forwarding operation 646. In the example of FIG. 6, the reference hash table 644 will be a 64 element array representing all values from 0 through 63 inclusive. Some elements of the reference hash table 644 are set as will be discussed hereinafter in relation to the preliminary operation series 512. If the value of the bit-wise subset "falls into one of the buckets" (is equivalent to a corresponding set bit in the reference hash table 644), then the data packet 210 is defined as being a "match".

Now returning to a consideration of the preliminary operation series 512 (FIG. 5) with an understanding of the packet processing operation series 514, the target memory 16 is configured in process steps much like those described in relation to the packet processing operation series 514 of FIG. 6.

Figure 7:
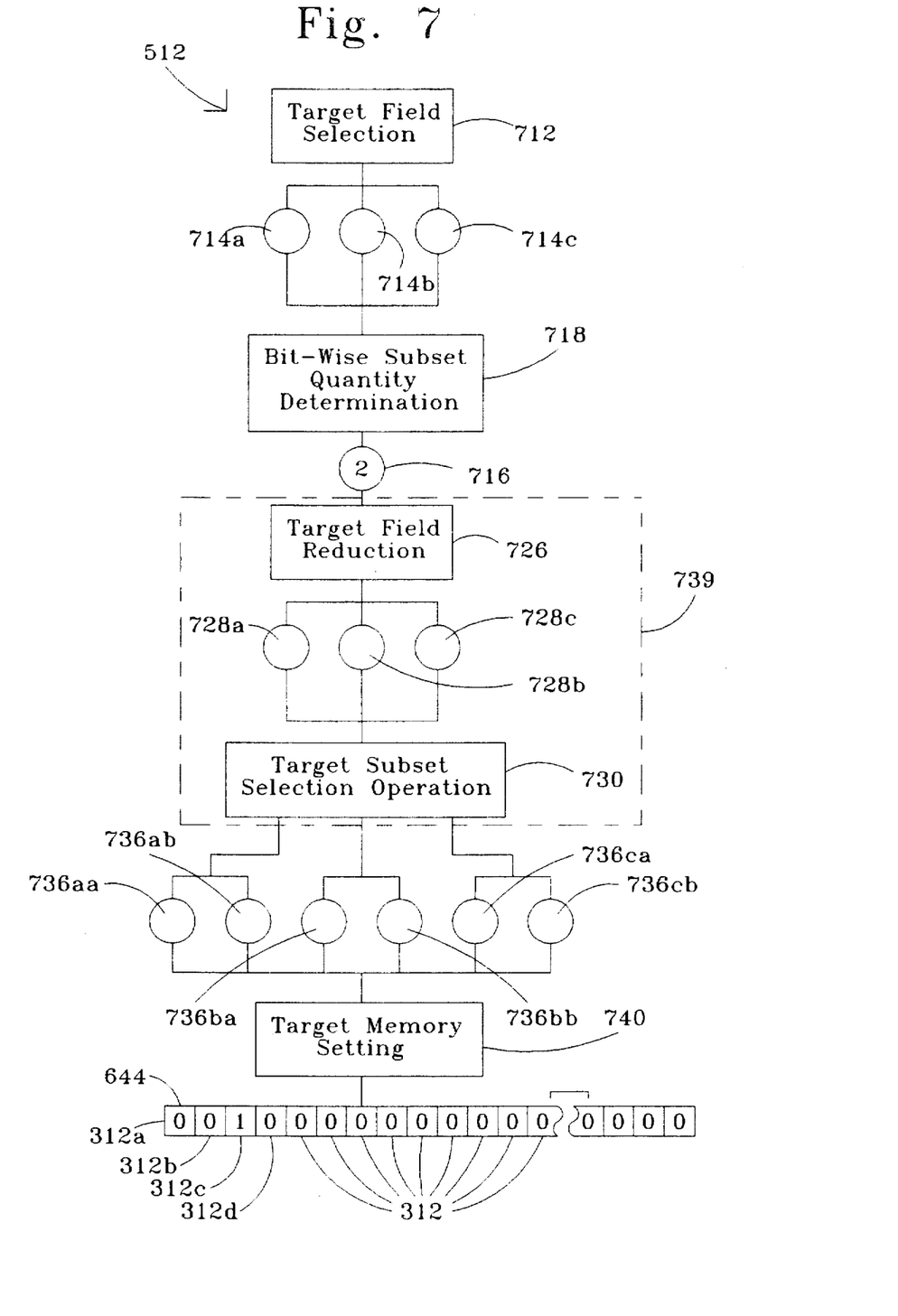
FIG. 7 is a flow chart depicting the preliminary operation series of FIG. 5.

FIG. 7 is a flow diagram of the preliminary operation series 512 according to the best presently known embodiment 10 of the present invention. A preliminary operation which is common to both the prior art and the present invention is a target field(s) selection process 712. The target (field) s selection process is merely the selection of criteria to which incoming packets 210 are to be compared. For example, if the entire process is to be on the basis of desired destinations, then an intended destination address 214 (FIG. 2) will be (one of) the target field(s) 714, and if three destinations are of interest, then there will be three target fields 714 as illustrated in the example of FIG. 7. The actual process involved in selecting the target field(s) is a function of network control software which is found in the prior art and which is not relevant to the present invention except to the extent that it delivers the target field(s) 714 to the inventive preliminary operation series 512.

Having determined the quantity of target fields 714 of interest, host software will next determine a bit-wise subset quantity 716 (the appropriate "subset quantity" of bit-wise subset 636) in a bit-wise subset quantity determination operation 718. The bit-wise subset quantity determination operation 718 will be discussed in more detail hereinafter, as it can be better understood in light of the present description of the entire preliminary operation series 512. For the present simplified example of FIGS. 6 and 7, and as already mentioned, the bit-wise subset quantity 716 is two. That is, two of the bit-wise subsets 636 are to be extracted from the CRC output value 628 in the subset selection operation 630 of FIG. 6.

As can be appreciated, the target fields 714 are each equivalent in form to the candidate fields 413 discussed previously herein, and processing of the target fields 714 is much the same as has been previously described herein in relation to the candidate fields 413. In the inventive preliminary operation series 512, each of the target fields 714 is processed in a target field reduction operation 726 by application of the CRC polynomial to produce a target CRC value 728. Each of the target CRC values 728 is then processed in a target subset selection operation 730 to produce a plurality (two for each target CRC value 728 for a total of six, in the present example) of target bit-wise subsets 736. In more general terms, each of the "target fields 714 (having been selected according to prior art methods as discussed previously, herein) is processed as described to produce a "target representative field" (the target CRC value 728 in the present example), which is then further processed as described to produce the "target indices", which target indices may be "target string subsets38 of the target representative field and which are, in the present example, the target bit-wise subsets 736. This process is alike to the process which is repeated as necessary to process each incoming data packet 210, wherein the candidate fields 413 are processed to produce a candidate representative field (the CRC output value 628 in the present example), which is further processed to produce the "candidate string subsets" (the bit-wise subsets 636 in the present example). The quantity of target bit-wise subsets 736 taken from each target CRC value 728 is also the bit-wise subset quantity 716 (two, in the present example). It should be noted that a target parallel hashing operation 739 is like the previously described parallel hashing operation 639 in that the invention might be practiced with variations of the specific steps therein which are presented here as features of the best presently known embodiment 10 of the present invention.

In a target memory setting operation 740 the reference hash table 644 is formatted such that each memory location 312 corresponding to a value of any of the target bit-wise subsets 736 is set. For example, if the first target bit-wise subset 736a were "000010" (decimal value 2) then the third memory location 312c in the reference hash table 644 would be set to "1", as is illustrated in FIG. 7. As can be appreciated from the above discussion, the maximum number of memory locations 312 in the reference hash table 644 which can be set by this process is the quantity of target bit-wise subsets 736 (six, in the present example). However, since two or more of the target bit-wise subsets might coincidentally hash to the same value, a lesser quantity of memory locations 312 might also be set.

Now returning to a more detailed discussion of the bit-wise subset quantity determination operation 718, the target memory 16 is to be configured to maximize the effectiveness of the filtering based on the quantity of multicast packets 210 of interest to the software of the host processor Therefore, the bit-wise subset quantity determination operation 718 attempts to determine (or, at least, to approximate) an optimal number of indices per packet (and, thus, the bit-wise subset quantity 716 discussed previously herein). The "optimal" number here means that which will minimize the number of "uninteresting" packets which match the set data bits 312 in the reference hash table 644 while matching all of the "interesting" packets 210. In the best presently known embodiment 10 of the present invention, the following table is used to determine the bit-wise subset quantity 716.

| TABLE OF SUBSET QUANTITIES | |
| --- | --- |
| Addresses of Interest | Number of Hash Indices Bit-Wise Subset Quantity 716 |
| 1–2 | 5 |
| 3 | 4 |
| 4–9 | 3 |
| 10–16 | 2 |
| 17 or more | 1 |

The above table is offered here as a guide only, in that the "optimal" number of selected hash indices may vary in ways not presently contemplated. Furthermore, it should be noted that the above table is based upon an assumption that none of the target indices (the target bitwise subsets 736 in the best presently known embodiment 10 of the present invention hash to the same memory locations 312 in the reference hash table 644. If, indeed, two or more of the target bit-wise subsets 736 did hash to the same memory location 312, then additional hash indices could be added to increase efficiency without sacrificing speed or requiring additional memory or processing.

It should be noted that while the packet processing operation series 514 is accomplished in the hardware of the best presently known embodiment 10 of the present invention, the preliminary operation series (which can be accomplished at a more leisurely pace) is performed primarily by software of the host processor 20. As can be appreciated in light of the above discussion, the preliminary operation series will be repeated when the network 12 is reconfigured, when it is desired to communicate with additional members of the network 12, or upon other occasions according to the needs of the user and the network 12. The packet processing operation series 514 will be repeated whenever an incoming packet is detected from the network node 18.

It should also be noted that, while the best presently known embodiment 10 of the present invention hashes each of the CRC values 628 and 728 to a common reference hash table 644, the invention might be practiced with equal efficiency by hashing each of the CRC values 628 and 728 to its own individual hash table (not shown). Using the quantities of the example of FIGS. 6 and 7, each of the individual hash tables would be 32 bits (memory locations 312) large (one half of 64 bits, since it must be divided between the two target CRC values 728). The individual bit-wise subsets 636 and 736 would then be 5 bits long (decimal value 0 through 31).

Various modifications may be made to the inventive improved packet filter 10 without altering its value or scope. For example, the quantity, size, and derivation of the plurality of bit-wise subsets 636 and 738 could readily be revised according to the parameters discussed herein.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The improved partial packet filter 10 is adapted to be widely used in computer network communications. The predominant current usages are for the interconnection of computers and computer peripheral devices within networks and for the interconnection of several computer networks.

The improved partial packet filters 10 of the present invention may be utilized in any application wherein conventional computer interconnection devices are used. A significant area of improvement is in the inclusion of the parallel processing of a plurality of indices (bit-wise subsets 636) of a packet The efficiency of the filtering provided by the improved partial packet filter 10 is significantly improved, particularly for cases where the number of targets is small relative to the number of "buckets" (memory locations 312). To compare the efficiency of the present inventive improved packet filtering process 510 embodied in the improved partial packet filter 10 with the prior art partial packet filtering process 410, assume, for example, the following values:

Mb=64 (representing 64 memory locations 312 in the reference hash table 644)

Cb=48 (representing a 48 bit candidate field 413 size—a typical size of the destination address 214

Dn=4 (representing a bit-wise subset quantity 716 of four)

Then, the prior art partial packet filtering process 410 will partition the $2^{Cb}$ possibilities among 64 distinct buckets, one of which matches the bucket into which the single target falls. In the improved packet filtering process 510, the four parallel hashing functions partition among 16 possible buckets each. The efficiency (Ef) for the prior art partial packet filtering process 410 would then be:

$$Ef=64/2^{48}=\tfrac{1}{2}^{42}$$

The efficiency (Ef4) for this example of the improved packet filtering process 510 is:

$$Ef4=64^4/(4^4*2^{48})=\tfrac{1}{2}^{32}$$

The efficiency Ef4 is better than the efficiency Ef by a factor of $2^{10}$ (1024), which is to say that only a thousandth as many (uninteresting) packets will be delivered to the next stage of filtering using the inventive improved partial packet filter 10 as compared to the prior art.

Filtering of packets may be accomplished through a combination of exact and partial match filters. Typically, one or more partial filterings will occur first, with the multiple dimensions of each filtering accomplished in parallel with each other (according to the present invention). Packets which pass through the inventive improved partial packet filter 10 may then be filtered using an exact match filter technique, such as "binary search lookup" of the filter data in a sorted table of acceptable filter data values. Furthermore, results of partial filtering can be used to determine which of many (possibly sorted) tables in which to search for the packet.

Accordingly, the inventive improved packet filtering process 510 may be applied more than once to each incoming packet 210 (in a first stage and a second stage). In such an example, configuration of the first stage partial filtering would involve specification of the number and type of hashing operations to be performed, along with the portion of the packet which is to comprise the filter data for each such operation, along with acceptable results for each. Multiple partial filterings may be configured with the specification including the logical relation to apply to the results of each filtering. For example, partial filtering A might be to apply the 32 bit CRC polynomial to the destination address field of an Ethernet packet, and retain the lowest order 3 bits—a value from 0 to 7. Partial filtering B might be to apply the 32 bit CRC polynomial to the source address field of the Ethernet packet, and retain the lowest order 3 bits. The logical relation might be to accept packets only for which the results of the first filtering (A) is either 2 or 4, and the result of the second filtering (B) is either a 3 or a 4. In a general case, one may expect the likelihood of arbitrarily filter data to "pass" the first filtering to be 2 in 8 (25%), since 2 of the 8 values from 0 to 7 are acceptable. Similarly, the likelihood of the second filtering "passing" such a filter is 2 in 8 (25%). Assuming that the two filterings are, as desired, truly independent, the likelihood of this arbitrary packet being accepted is the product of these, or 1 in 16. Note further that the specification of these "acceptable result sets" ({2,4} for A and {3,4} for B) requires 16 bits of information for full specification, where 8 bits indicate the acceptability/unacceptability of each of the 8 possible values of filtering A, and 8 additional bits indicate the acceptability/unacceptability of each of the 8 possible values of filtering B. Use of such multiple partial filterings may be especially effective in situations where filtering criteria are derived from independent portions of the filter data, such as filtering for all packets whose destination address OR whose source address is within a set of interesting addresses AND whose packet type indicates a particular protocol of interest.

Since the improved partial packet filters of the present invention may be readily constructed and are compatible with existing computer equipment it is expected that they will be acceptable in the industry as substitutes for conventional means and methods presently employed for partial packet filtering. For these and other reasons, it is expected that the utility and industrial applicability of the invention will be both significant in scope and long-lasting in duration.

We claim:

1. A method for selectively forwarding a data packet and controlling the distribution of data packets in a computer network system, the data packet having a candidate field containing information about the data packet, the method comprising:

configuring a target memory of a controller to contain a target hash array in steps including;

aa determining a target field and extracting a plurality of target indices from said target field, the target indices being a binary number having a value;

ab setting memory locations in the target memory corresponding to the value of each of the target indices; and processing the data packet in steps including:

ba extracting the candidate field from the data packet;

bb extracting from the candidate field a plurality of candidate field indices;

bc comparing the values of each of the candidate field indices to the target hash array; and bd forwarding the packet when each of the values of each of the candidate field indices corresponds to a memory location of the target hash array which was set in step ab.

2. The method of claim 1, wherein:

step aa is accomplished in substeps including:

aa1 reducing the target fields to a plurality of target representative fields; and aa2 selecting one or more target string subsets from the target representative field; and step bb is accomplished in substeps including:

bb1 reducing the candidate field to a plurality of candidate representative fields; and bb2 selecting one or more candidate string subsets from the target representative field.

3. The method of claim 1, wherein:

step ab is accomplished by causing only those memory locations in the target memory which correspond to the value of each of the target string subsets to contain a value of one.

4. The method of claim 2, wherein:

step aa1 is accomplished by applying a cyclic redundancy check algorithm to each of the target fields; and step bb1 is accomplished by applying the same cyclic redundancy check algorithm to the candidate field.

5. The method of claim 2, wherein:

in step aa2 the target string subsets are selected by extracting a plurality of target bit-wise subsets from the target representative field; and in step bb2 the candidate string subsets are selected by extracting a plurality of candidate bit-wise subsets from the representative candidate field.

6. The method of claim 2, and further including:

an additional process step preceding step ab wherein a subset quantity is determined, the subset quantity being the number of target string subsets to be extracted from each of the target representative fields and also the number of candidate string subsets to be extracted from each of the candidate representative fields.

7. The method of claim 6, wherein:

the additional process step is accomplished, at least initially, by selecting the subset quantity from a table of subset quantities.

8. The method of claim 2, wherein:

each of the target representative target and the candidate representative field are 32 bits in length.

9. The method of claim 1, wherein:

steps aa through ab are repeated when a change in the distribution of data packets is desired.

10. The method of claim 1, wherein:

steps ba through bd are repeated for each incoming data packet.

11. The method of claim 1, and further including:

an additional process step preceding step ab wherein a subset quantity is determined, the subset quantity being the number of target indices to be extracted from each of the target fields and also the number of candidate indices to be extracted from each of the candidate fields.

12. The method of claim 11, wherein:

the additional process step is accomplished, at least initially, by selecting the subset quantity from a table of subset quantities appropriate to a quantity of target quantities.

13. The method of claim 1, wherein:

the candidate field includes a target address field of the data packet.

14. The method of claim 1, wherein:

the data packet is a standardized Ethernet data packet.

15. The method of claim 1, wherein:

the target hash array is an unapportioned array such that each of the target indices is used to set memory locations in that unapportioned array.

16. The method of claim 1, wherein:

the target hash array is apportioned such that at least some of the target indices are directed to different portions of the target hash array.

17. The method of claim 1, wherein:

the target indices and the candidate indices are each a binary string of fixed bit length.

* * * * *